Sept. 25, 1962            W. KREBS            3,055,963
POROUS ELECTRODES
Filed Nov. 17, 1958
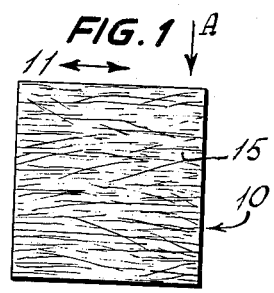
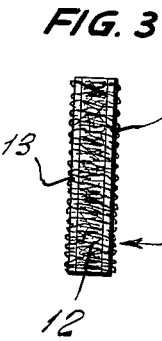
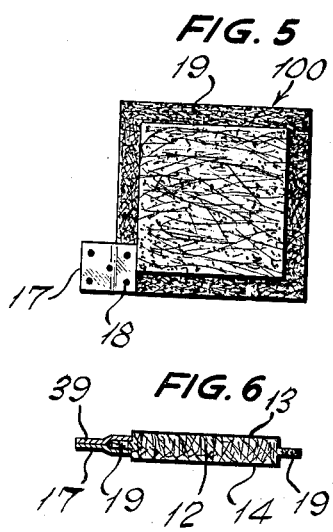
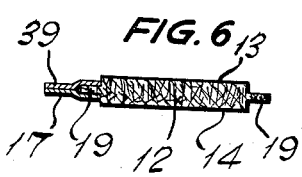
INVENTOR
WILLI KREBS
BY
Nolte & Nolte
ATTORNEYS

United States Patent Office 3,055,963
Patented Sept. 25, 1962

3,055,963
POROUS ELECTRODES
Willi Krebs, Schwalbacher Strasse 3, Wiesbaden, Germany
Filed Nov. 17, 1958, Ser. No. 774,317
Claims priority, application Germany Nov. 27, 1957
9 Claims. (Cl. 136—51)

This invention relates generally to electrodes for storage batteries and in particular to electrodes for use in storage batteries employing alkaline electrolytes, wherein the supports for the active masses of the electrodes are formed by metal fibers sintered to one another.

The invention is also concerned with a process and apparatus for the production of such electrodes and electrode supports.

Common sintered electrodes have certain disadvantages such as, for example, insufficient mechanical stability. Further, in known sintered electrodes the active masses tend to work loose and fall out from the supports. Such electrodes are also unnecessarily heavy due to border framing and other required reinforcements, which in turn reduce the electrical capacity of the electrodes.

It is an object of this invention to provide an electrode eliminating these disadvantages and to provide a method and means for producing an improved electrode of increased capacity and reduced weight.

A further object of the invention is to produce and to provide means for producing an improved sintered electrode support wherein the metal fibers of the electrode support are sintered to form a porous plate or lattice of great stability, resistance and interior strength, both in the longitudinal and transverse directions of the plate.

Other objects and advantages of the present invention will appear from the following detailed description thereof and the accompanying drawings, forming part of this application.

In the drawings:

FIG. 1 in an elevation of a sintered metal fiber block prepared in accordance with the present invention, and illustrating the first stage in the production of an inventive electrode;

FIG. 2 is a cross-sectional view of a plate or slice cut off from the block of FIG. 1;

FIG. 3 is a cross-section of the plate of FIG. 2 with reinforcing layers sintered to opposite faces thereof;

FIG. 4 is a diagrammatic representation of a charged sintering apparatus shown in cross-section;

FIG. 5 is an elevation of a finished electrode plate; and

FIG. 6 is a cross-section through a finished electrode plate as, for example, shown in FIG. 5.

Briefly and in accordance with this invention, electrode supports in plate form comprise a plurality of sintered metal fibers oriented in a direction substantially perpendicular to the plane of the plate, the free ends or points of the fibers being integrally bonded to porous reinforcing layers which thus constitute two opposite side faces of the plate.

FIGS. 1, 2 and 3 of the drawings illustrate various production steps in the production of an inventive electrode plate in accordance with the inventive method. In FIG. 1 reference numeral 10 generally indicates a block comprised of a plurality of thin metal fibers 15 sintered to each other so as to form a self supporting porous structure. It will be noted that most of the fibers extend substantially in the same direction, i.e. the direction indicated by the arrow 11.

As previously mentioned, the block 10 is comprised of metal fibers. The term "metal fibers" is used in this specification and the appended claims in a very broad sense and is deemed to include both very thin metal wires, metal threads, metal shavings and the like, the metal of which lends itself to electrode production, and metallized fibers of organic or inorganic nature such as glass fibers, silicon fibers or synthetic fibers, e.g. polyamide fibers which have been renedered conductive to electric current by a galvanically deposited metal coat or the like.

Particularly suitable are metal fibers having a roughened surface, such as, for example, fibers of metal wool. The cross-sectional diameter of the individual fibers should only be a few microns, e.g. 1–5 microns. Consequently, iron wool or iron shavings is a favored raw material for the inventive purpose, since they are inexpensive. In the embodiment shown in the drawings nickel-coated iron fibers or nickel fibers proper with a cross-sectional diameter of a few microns are used for a positive plate, while iron wool fibers proper of a cross-sectional diameter of 1 to 4 microns are employed for a negative plate.

The block 10 of FIG. 1 may have a cross-sectional area of for example 150 x 150 mm.

With a view to obtaining the block 10 shown in FIG. 1, the individual metal fibers are stacked so that most of the fibers extend in the same direction, whereafter the stack is sintered under a protective atmosphere, e.g. hydrogen, at a temperature of about 1000° C. The sintering is preferably performed under slight pressure, whereby a porous, strong structure is obtained. Care should be taken that the sintering is performed in such a way that only abutting or intersecting portions of the fibers are sintered to each other, since otherwise the porosity of the block would be impaired.

A plurality of slices or plates are then cut from the block 10. The cutting may be effected mechanically by rotating knifes or the like, in a plane (see arrow A) perpendicular to the plane indicated by the arrow 11.

FIG. 2 illustrates a slice or plate 100 cut from the block 10 which plate has a thickness of about 4 mm. The individual sintered metal fibers 12, which thus are fragments of the fibers 15 of the block 10, obviously extend in the same general direction indicated by the arrow 11.

FIG. 3 shows the plate 100 of FIG. 2 after its side faces have been covered with porous reinforcing layers 13 and 14, respectively. These layers in the present embodiment comprise fine mesh wire netting of nickel or iron having a strength of 0.1 to 0.2 mm.

It should be noted, however, that instead of wire netting, other porous reinforcing means or layers may be employed. For example, it is feasible to use porous metal fiber fleeces or the like. It is thus possible to reinforce the fiber plates by sintering to the terminal portions of the fibers one or two fiber fleece layers with intersecting or cross-wise arranged fibers.

If the plate 100 is composed of coated e.g. nickel-coated fibers, the cut surfaces of the plate should be coated, e.g. nickel-coated prior to applying the wire mesh.

Very fine nickel powder or iron powder, respectively, is then incorporated in the pores of the mesh on both sides, whereafter the mesh and the plate are integrally bonded to each other, in other words the points or terminal portions of the fibers 12 are sintered to the mesh and the metal powder therewithin on each side.

The sintering is advantageously carried out in an apparatus or furnace as shown in FIG. 4. The furnace, generally indicated by reference numeral 30, comprises a housing or casing 23 which is heated by electrical coils 24. It will be realized, of course, that other heating means may be employed. A kettle-like structure 22 is disposed within the casing. The kettle has a lid 33 by means of which the kettle may be closed. Sealing or locking means, generally indicated by reference numeral 34, assure an airtight closure. The lid is provided with an air inlet valve 37 and an air outlet valve 36 which latter is connected to a vacuum pump (not shown). A number of molds or formers 26 are removably arranged within the kettle 22, one above the other. Successive formers form recesses into which the mesh covered plates 100 are placed. The formers or molds consist of graphite, pure carbon or graphite-coated iron. Spacer elements 28 are provided between any two molding elements, the height of the spacers corresponding to the height of the rim or edge portion of the plate to be sintered. It will be noted that in the furnace of FIG. 4 six superimposed molding elements are provided whereby five plates may be sintered at the same time. It will be realized, however, that dependent on the size of the kettle any number, for example 20 to 50 plates, or more may be molded simultaneously. The plates 100 of FIG. 4 are placed between the formers whereafter a weight, schematically indicated by reference numeral 32, is placed on the topmost former. Obviously, other pressure means may be employed. When the plates have been placed in position, the kettle is sealed by the lid and the locking means in airtight manner. The kettle is now evacuated and the casing 23 is heated to about 1100° C. The previously mentioned heating coils 24 are provided for this purpose. However, induction heating, high frequency heating or gas heating may, of course, also be used. The heating time in the present embodiment is about ½ to 1 hour during which time the wire mesh will be securely united to the plate proper. Upon completion of the sintering time the charge is gradually cooled to 650° C. while the vacuum is maintained. The oxygen which is comprised in the graphite-containing formers combines during the heating with the carbon and forms thereby a permanent protective gas layer above the plates which layer prevents oxidation. This protective gas layer induces an excellent sintering. It is thus ordinarily unnecessary to supply additional protective gas.

When the sintered plates have been cooled to about 650° C., the valve 37 is opened so as to admit air or oxygen, and the kettle is rapidly quenched, for example, by placing it in water or by other cooling means. The quenching causes a slight oxidation on the surface of the sintered plates without, however, destroying the structure. The oxides thus formed on the surface of the individual plates increase the capacity of the plates when used in a storage battery. After the sintering procedure the weight of the electrode plate is about 50 grams. The thickness of the plates is about 3 mm. while the edge or border portion of the plate which is determined by the height of the spacers 28 is about 0.75 mm. The terminal portions of the individual fibers of the plates which prior to the sintering project through the pores of the mesh are bent by the pressure sintering to form hooks which become integrally bonded to the mesh and the metal powder within the pores thereof.

The plates are then removed from the sintering apparatus and may be strengthened on their border portions by, for example, galvanically applying thereto a nickel deposit. Thereafter two, for example, nickel coated metal sheets may be secured to the border portions by spot welding (see FIG. 6). The nickel coated sheets may have a thickness of about 0.5 mm. These sheets act as terminals for supplying or discharging current.

The thus prepared plates are now activated. For this purpose the positive nickel electrode plate is soaked with a nickel salt, e.g. nickel sulphate solution which is saturated at room temperature, whereafter nickel hydroxide is precipitated with sodium or potassium hydroxide of 30% strength at a temperature of 70° C. In order to prepare negative plates, the structure obtained after the sintering process is soaked in a saturated cadmium nitrate solution whereafter the cadmium hydroxide is precipitated in a 30% potassium hydroxide solution of 70° C.

The thus activated plates are thoroughly rinsed with water and dried at 100 to 120° C. whereafter the impregnation treatment is repeated until all the interstices or pores of the porous structure have been filled with the activating metal salts. It has been ascertained that upon repeating the precipitation treatment of the nickel hydroxide and the cadmium hydroxide respectively three times, a quantity corresponding to the weight of the support proper or more may be precipitated in the pores as active substance.

The thus activated electrodes may now be further compressed mechanically to, for example, 1.5 mm. thickness. In doing so, the sintered metal fibers which extend substantially in a direction perpendicular to the plane of the plate are distorted or bent without that the stability of the structure is negatively effected and without breaking the sintered connecting points between the fibers and the mesh. On the contrary, the mechanical compression of the plates results in a still better embedding of the active masses within the support structure whereby the conductivity and capacity are increased. Further, the volume of the plates is reduced by the mechanical compression, which, of course, is of great advantage.

FIGURES 5 and 6 illustrate a finished electrode plate 100 as obtained after the sintering in the furnace of FIG. 4. The dimensions of this particular plate are 150 x 150 x 1.5 mm. The circumferential border zone which is narrower and more compact than the body portion of the plate is indicated by reference numeral 19. The metal connecting strips or terminals previously referred to are indicated by reference numerals 17 and 39. They are spot welded to the border 19 at 18.

From the preceding description it will have become obvious that in accordance with the invention there is provided an electrode plate comprising a sintered porous support structure of great stability, wherein the metal fibers constituting the support are sintered to each other and extend in a direction substantially perpendicular to the plane of the support while the points of the fibers are integrally bonded to reinforcing layers such as wire mesh. In this manner a prestressed, strong structure is obtained within which relatively large amounts of active masses may be accommodated.

The inventive electrode plate is extremely resistant to swelling, bulging and fuzzing. The fibers which extend transversely to the plane of the plate rigidly hold the reinforcing layers or wire meshes in position whereby it is rendered feasible to lodge considerably more active substance within the support structure than has been possible heretofore.

The mechanical distortion of the fibers after the sintering results in the fact that the active masses are still more securely held within the pores of the support structure, since they become tightly wedged between the fiber surfaces, whereby loss of active masses is prevented, which in turn results in increased capacity.

The edge or border portion of the support structure, as has been explained, is also porous, however, it is stronger, more compact and more tightly sintered and compressed than the center portion. A distinct transition zone between the center and edge portions of the plate is thus eliminated, because the points of the interior fibers which extend transversely to the plate are securely sintered to the reinforcing layers both in the center portion and also in the edge portion. This again makes it possible to use continuous reinforcing layers or mesh which uninterruptedly cover the center and the edge portion. Since there is a continuous transition from the center to the edge portions, bulging of the electrode plate at the transition zone is prevented. It will thus be realized that it is not necessary to provide additional reinforcements or border framings for the edge portions, as was hitherto required. Furthermore, since the entire electrode plate including the border portions is porous, the border portion also takes place in the chemical reactions of the active masses so that the border portions are not lost for the capacity of the plate and are properly utilized.

It should also be noted that it is possible to add metal powder or metal oxides prior to the first sintering step, i.e. the individual metal fibers may be admixed with such powder whereby the surface area or the structure will be increased, and the sintering between the individual fibers will be facilitated.

The precipitation of the nickel hydroxide and cadmium hydroxide may also be accomplished by electrolysis which is continued until all the pores of the structure have been filled with the respective hydroxide.

The inventive electrode plates have all the properties and characteristics which are expected and desired from a high-class product. While the inventive plates are lighter than known ones, the capacity is considerably increased. Both positive and negative electrodes may be produced, and any desired shape may be given to the plates which may be square, round or the like. Further, the internal resistance of the inventive electrode plates is exceedingly small. Storage batteries employing the inventive plates may thus particularly successfully be employed for purposes wherein the battery is subjected to shock action, e.g. in starter batteries for motor cars.

It should be pointed out that the sintering of the reinforcing layers to the fiber plates need not be performed under vacuum, since it is feasible to operate under atmospheric pressure provided a protective atmosphere is provided.

Obviously, many modifications and variations of the present invention are possible in the light of the above teachings. It is therefore to be understood that within the scope of the appended claims the invention may be practiced otherwise than as specifically described.

What is claimed is:

1. A porous support plate for the active masses of an electrode, comprising in combination: a plurality of short and thin metal fibers sintered to each other so as to form a plate, the majority of said fibers extending substantially perpendicular to the plane of the plate so that the length of said fibers substantially corresponds to the thickness of the plate, and porous metal facings integrally sintered to the terminal portions of said fibers.

2. A porous support plate as claimed in claim 1, wherein said facings comprise fine-mesh wire netting.

3. A porous support plate as claimed in claim 1, wherein said fibers are compressed in a direction perpendicular to their general direction, whereby said fibers are deformed and buckled.

4. A porous support plate as claimed in claim 1, wherein metal powder is provided within the pores of the plate and sintered to said fibers.

5. A porous support plate as claimed in claim 1, wherein the plate has a circumferential border portion integral with the plate proper but more compact and compressed to a thickness less than that of the body portion of the plate.

6. A porous electrode comprising: a plate-shaped porous support formed by a plurality of thin metal fibers sintered to each other, the majority of said fibers extending perpendicularly to the plane of said support so that the length of said fibers substantially corresponds to the thickness of said support, metal wire mesh facings integrally united to the terminal portions of said fibers and extending substantially perpendicular to said fibers, and activating masses securely held within the pores of said support and said facings.

7. A porous electrode as claimed in claim 6, wherein metal powder is provided within said pores of the support and sintered to said fibers.

8. A porous electrode as claimed in claim 6, wherein metal powder is provided within said pores of the support and said facings and sintered to said fibers and said facings.

9. A porous electrode as claimed in claim 6, wherein said mesh-covered support has a circumferential border portion integral with the support proper but more compact and compressed to a thickness less than that of the body portion of said support.

References Cited in the file of this patent

UNITED STATES PATENTS

| | | |
|---|---|---|
| 299,178 | Stanley | May 27, 1884 |
| 703,875 | Winship | July 1, 1902 |
| 1,447,657 | Gouin et al. | Mar. 6, 1923 |
| 1,450,533 | Williams | Apr. 3, 1923 |
| 2,386,835 | Beatty | Oct. 16, 1945 |
| 2,615,930 | Moulton et al. | Oct. 28, 1952 |
| 2,627,531 | Vogt | Feb. 3, 1953 |
| 2,654,588 | Somogyi | Oct. 6, 1953 |
| 2,683,182 | Salauze | July 6, 1954 |
| 2,724,733 | Hagspihl et al. | Nov. 22, 1955 |
| 2,830,108 | Peters | Apr. 8, 1958 |
| 2,833,847 | Salauze | May 6, 1958 |

FOREIGN PATENTS

| | | |
|---|---|---|
| 11,861 | Great Britain | Sept. 28, 1905 |
| 751,725 | Great Britain | July 4, 1956 |